United States Patent
Lu et al.

(10) Patent No.: US 12,035,273 B2
(45) Date of Patent: Jul. 9, 2024

(54) POSITIONING METHOD AND APPARATUS FOR COMMUNICATION DEVICE, AND COMPUTER DEVICE AND STORAGE MEDIUM

(71) Applicants: GUANGDONG OPPO MOBILE TELECOMMUNICATIONS CORP., LTD., Guangdong (CN); Tsinghua University, Beijing (CN)

(72) Inventors: Qianxi Lu, Guangdong (CN); Yuan Shen, Beijing (CN); Yuanpeng Liu, Beijing (CN)

(73) Assignees: GUANGDONG OPPO MOBILE TELECOMMUNICATIONS CORP., LTD., Guangdong (CN); Tsinghua University, Beijing (CN)

( * ) Notice: Subject to any disclaimer, the term of this patent is extended or adjusted under 35 U.S.C. 154(b) by 492 days.

(21) Appl. No.: 17/499,425

(22) Filed: Oct. 12, 2021

(65) Prior Publication Data
US 2022/0030545 A1 Jan. 27, 2022

Related U.S. Application Data

(63) Continuation of application No. PCT/CN2019/083522, filed on Apr. 19, 2019.

(51) Int. Cl.
*H04W 64/00* (2009.01)
(52) U.S. Cl.
CPC .................. *H04W 64/006* (2013.01)
(58) Field of Classification Search
CPC .................................................. H04W 64/006
See application file for complete search history.

(56) References Cited

U.S. PATENT DOCUMENTS

| | | | | |
|---|---|---|---|---|
| 2001/0045905 A1* | 11/2001 | Syrjarinne | ............ | G01S 5/0009 342/357.31 |
| 2012/0177027 A1* | 7/2012 | Venkatraman | .......... | G01S 5/145 370/350 |

(Continued)

FOREIGN PATENT DOCUMENTS

| | | |
|---|---|---|
| CN | 1360804 A | 7/2002 |
| CN | 102736090 A | 10/2012 |
| CN | 104157167 A | 11/2014 |

OTHER PUBLICATIONS

International Search Report with English Translation for PCT/CN2019/083522 mailed Jan. 19, 2020.

*Primary Examiner* — Barry W Taylor
(74) *Attorney, Agent, or Firm* — Young Basile Hanlon & MacFarlane, P.C.

(57) ABSTRACT

A method for positioning a communication device includes: receiving measurement information between a node to be positioned and a set of reference nodes of at least one type, the measurement information including an initial pseudorange and initial orientation angle measurement information between the node to be positioned and a reference node, and the set of reference nodes including at least one reference node; and substituting the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

20 Claims, 6 Drawing Sheets

(56) References Cited

U.S. PATENT DOCUMENTS

| | | | |
|---|---|---|---|
| 2013/0029686 A1* | 1/2013 | Moshfeghi | H04W 4/021 |
| | | | 455/456.1 |
| 2013/0346423 A1 | 12/2013 | MacGougan et al. | |
| 2021/0215832 A1* | 7/2021 | Liu | G01S 19/485 |
| 2023/0176228 A1* | 6/2023 | Wang | G01S 5/0264 |
| | | | 342/352 |

* cited by examiner

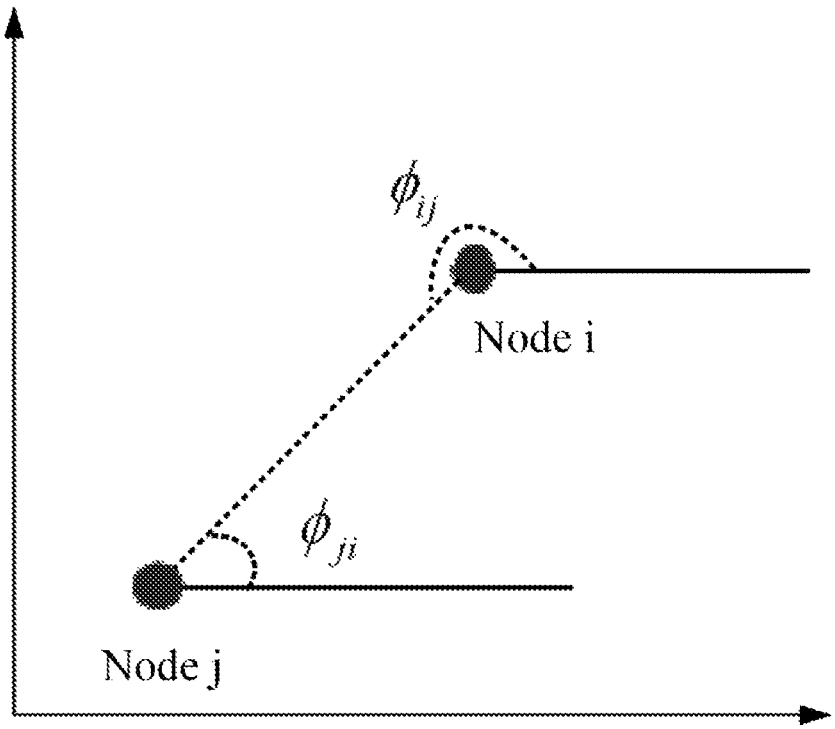

FIG. 6

Substitute the measurement information into a gradient expression corresponding to the cost function for iterative operation, and acquire an iterative parameter in the m-th iteration of the node to be positioned, m being an integer greater than or equal to 0 — S301

Calculate an iterative parameter in the (m+1)-th iteration of the node to be positioned using the gradient expression according to the iterative parameter in the m-th iteration and the cost function — S302

FIG. 7

POSITIONING METHOD AND APPARATUS FOR COMMUNICATION DEVICE, AND COMPUTER DEVICE AND STORAGE MEDIUM

CROSS-REFERENCE TO RELATED APPLICATION(S)

The present application is a continuation application of the International PCT Application No. PCT/CN2019/083522, having an international filing date of Apr. 19, 2019, the entire content of which is hereby incorporated by reference.

TECHNICAL FIELD

The present application relates to the field of Internet of Vehicles, and more particularly, to a method and a device for positioning a communication device, a computer device and a storage medium.

BACKGROUND

The Internet of Vehicles (IoV) is a huge interactive network composed of information such as vehicle position, speed and route, and effective positioning of vehicles is often required in Internet of Vehicles applications.

At present, three vehicle positioning methods, which are cell-ID-based (CID) positioning, observed time difference of arrival (OTDOA)-based positioning and assisted global navigation satellite system (A-GNSS)-based positioning respectively, are specified in the 3rd Generation Partnership Project (3GPP). The OTDOA-based positioning and the A-GNSS-based positioning, which are also the daily used positioning methods at present, have higher precision. The OTDOA-based positioning, which relies on base stations, is similar in principle to the A-GNSS-based positioning, which relies on satellites. A positioning process will be described briefly in the following by taking the A-GNSS-based positioning as an example. Using a certain satellite as a reference satellite, a pseudorange between a vehicle and the reference satellite is subtracted from a pseudorange between the vehicle and another satellite to obtain a pseudorange difference, and vehicle position parameters are obtained through multiple pseudorange differences by using a least square algorithm and relying on a Taylor expansion iterative algorithm.

However, the above method has problems of low positioning precision and unclear vehicle status, and as a result can hardly meet the requirements of the Internet of Vehicles.

SUMMARY

Therefore, it is necessary to provide a method and a device for positioning a communication device, a computer device and a storage medium, to address the technical problem that the above method has problems of low positioning precision and unclear vehicle status, and as a result can hardly meet the requirements of the Internet of Vehicles.

In a first aspect, an embodiment of the present disclosure provides a method for positioning a communication device, which includes: receiving measurement information between a node to be positioned and a set of reference nodes of at least one type, the measurement information including an initial pseudorange and initial orientation angle measurement information between the node to be positioned and a reference node, and the set of reference nodes including at least one reference node; and substituting the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

In one embodiment, the parametric formula is:

$$f(z \mid p, b, \phi) \propto \exp\left\{-\sum_{i \in N_c} \sum_{k \in N_s} \lambda_{ik}(\|p_i - p_k\| + b_i - \tilde{d}_{ik})^2 - \sum_{i \in N_c + N_b} \sum_{k \in N_c + N_b} [\lambda_{ik}(\|p_i - p_k\| + b_i - b_k - \tilde{d}_{ik})^2 + ([\tilde{\theta}_{ik}\tilde{\phi}_{ik}] - [\bar{\theta}_{ik}\bar{\phi}_{ik}])C_{ik}^{-1}([\tilde{\theta}_{ik}\tilde{\phi}_{ik}] - [\bar{\theta}_{ik}\bar{\phi}_{ik}])^T] \right\}, \quad (1)$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2 \ldots, b_i, \ldots b_{N_c}]$, an orientation angle parameter vector between the node i to be positioned and the reference node is $\phi=[\phi_1, \phi_2 \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_2\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\bar{\theta}_{ki} = \cos^{-1}\frac{z_k - z_i}{d_{ik}},$$

an azimuth angle of the node i to be positioned relative to the reference node k is $$\bar{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In one embodiment, substituting the measurement information into the preset parametric formula to obtain the positioning information of a vehicle includes: substituting the measurement information into a cost function corresponding to the parametric formula to obtain the positioning information of the node to be positioned, the cost function being used for indicating the possibility that the positioning information is the value of the preset variable.

In one embodiment, if nodes to be positioned include at least two nodes, the cost function is:

$$H(z \mid p, b, \phi) = \sum_{i \in N_c} \sum_{k \in N_s} \lambda_{ik}(\|p_i - p_k\| + b_i - \tilde{d}_{ik})^2 + \quad (2)$$

$$\sum_{i \in N_c+N_b} \sum_{k \in N_c+N_b} [\lambda_{ik}(\|p_i - p_k\| + b_i - \tilde{d}_{ik})^2 +$$

$$([\tilde{\theta}_{ik}\tilde{\phi}_{ik}] - [\overline{\theta}_{ik}\overline{\phi}_{ik}])C_{ik}^{-1}([\tilde{\theta}_{ik}\tilde{\phi}_{ik}] - [\overline{\theta}_{ik}\overline{\phi}_{ik}])^T],$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2 \ldots b_{N_c}]$, an orientation angle parameter vector between the node i to be positioned and the reference node is $\phi=[\phi_1, \phi_2 \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\overline{\theta}_{ki} = \cos^{-1}\frac{z_k - z_i}{d_{ik}},$$

an azimuth angle of the node i to be positioned relative to the reference node k is $$\overline{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In one embodiment, substituting the measurement information into the preset parametric formula to obtain the positioning information of a vehicle includes: substituting the measurement information into a cost function corresponding to the parametric formula to obtain the positioning information of the node to be positioned, the cost function being used for indicating the possibility that the positioning information is the value of the preset variable.

In one embodiment, if nodes to be positioned include at least two nodes, the cost function is:

$$H(z \mid p, b, \phi) = \sum_{i \in N_c} \sum_{k \in N_s} \lambda_{ik}(\|p_i - p_k\| + b_i - \tilde{d}_{ik})^2 + \quad (2)$$

-continued $$\sum_{i \in N_c+N_b} \sum_{k \in N_c+N_b} [\lambda_{ik}(\|p_i - p_k\| + b_i - b_k - \tilde{d}_{ik})^2 +$$

$$([\tilde{\theta}_{ik}\tilde{\phi}_{ik}] - [\overline{\theta}_{ik}\overline{\phi}_{ik}])C_{ik}^{-1}([\tilde{\theta}_{ik}\tilde{\phi}_{ik}] - [\overline{\theta}_{ik}\overline{\phi}_{ik}])^T],$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2 \ldots, b_i, \ldots b_{N_c}]$, an orientation angle parameter vector between the node i to be positioned and the reference node is $\phi=[(\phi_1, \phi_2 \ldots \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\overline{\theta}_{ki} = \cos^{-1}\frac{z_k - z_i}{d_{ik}},$$

an azimuth angle of the node i to be positioned relative to the reference node k is $$\overline{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_k$ is a measured value of the azimuth angle of the node i to be positioned relative to the reference node k, and $C_{ik}^{-1}$ is an inverse matrix of a covariance matrix of gaussian noise.

In one embodiment, if the node to be positioned includes one node, the cost function is:

$$H_i(p_i, b_i, \phi_i) = \sum_{k \in N_S} \lambda_{ik}(\|p_i - p_k\| + b_i - \tilde{d}_{ik})^2 + \quad (3)$$

$$\sum_{k \in N_C+N_b} [\lambda_{ik}(\|p_i - p_k\| + b_i - b_k - \tilde{d}_{ik})^2 +$$

$$([\tilde{\theta}_{ik}\tilde{\phi}_{ik}] - [\overline{\theta}_{ik}\overline{\phi}_{ik}])C_{ik}^{-1}([\tilde{\theta}_{ik}\tilde{\phi}_{ik}] - [\overline{\theta}_{ik}\overline{\phi}_{ik}])^T],$$

wherein a position parameter of the node i to be positioned is $p_i=[x_i, y_i, z_i]^T$, a position parameter vector of the reference node k is $p_k=[x_k, y_k, z_k]^T$, a clock deviation parameter between the node i to be positioned and the reference node is $b_i$, an orientation angle parameter of the node i to be positioned is $\phi_i$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_ib_k+\omega_{ik}$, $d_{ik}=\|p_i-p_k\|$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\bar{\theta}_{ki} = \cos^{-1}\frac{z_k - z_i}{d_{ik}},$$

an azimuth angle of the node i to be positioned relative to the reference node k is $$\bar{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In a second aspect, an embodiment of the present disclosure provides a device for positioning a communication device, which includes: a receiving module configured to receive measurement information between a node to be positioned and a set of reference nodes of at least one type, the measurement information including an initial pseudorange and initial orientation angle measurement information between the node to be positioned and a reference node, and the set of reference nodes including at least one reference node; and a processing module configured to substitute the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

In a third aspect, an embodiment of the present disclosure provides a computer device including a memory and a processor. The memory stores a computer program, and the processor implements the steps of the method according to the first aspect when executing the computer program.

In a fourth aspect, an embodiment of the present disclosure provides a computer readable storage medium having stored thereon a computer program. When the computer program is executed by a processor, the steps of the method according to the first aspect are implemented.

In the method and device for positioning a communication device, the computer device and the storage medium, measurement information between a node to be positioned and a set of reference nodes of at least one type is received, and the measurement information is substituted into a preset parametric formula to obtain positioning information of the node to be positioned. As the measurement information is substituted into the parametric formula, a possibility that the positioning information is the value of a preset variable is determined, and the value of the preset variable with the greatest possibility is determined as the positioning information, thereby improving the positioning precision. Moreover, the measurement information includes not only an initial pseudorange between the node to be positioned and a reference node, but also initial orientation angle measurement information between the node to be positioned and the reference node, so as to obtain the positioning information including the position information, clock deviation information and orientation angle information of the node to be positioned, such that not only the position of the node can be determined, but also status information such as a clock deviation and an orientation angle of the node can be determined, thereby meeting the requirements of the Internet of Vehicles effectively.

BRIEF DESCRIPTION OF DRAWINGS

FIG. 6 is a schematic diagram of node angle measurement relationship in accordance with an embodiment;

FIG. 7 is a flow chart of a method for positioning a communication device in accordance with another embodiment of the present application;

DETAILED DESCRIPTION

For better understanding of the objects, technical schemes, and advantages of the present application, the present application will be described in further detail below in conjunction with the drawings and embodiments. It should be understood that the embodiments described herein are intended to explain the present application only, but are not intended to limit the present application.

Figure 1:
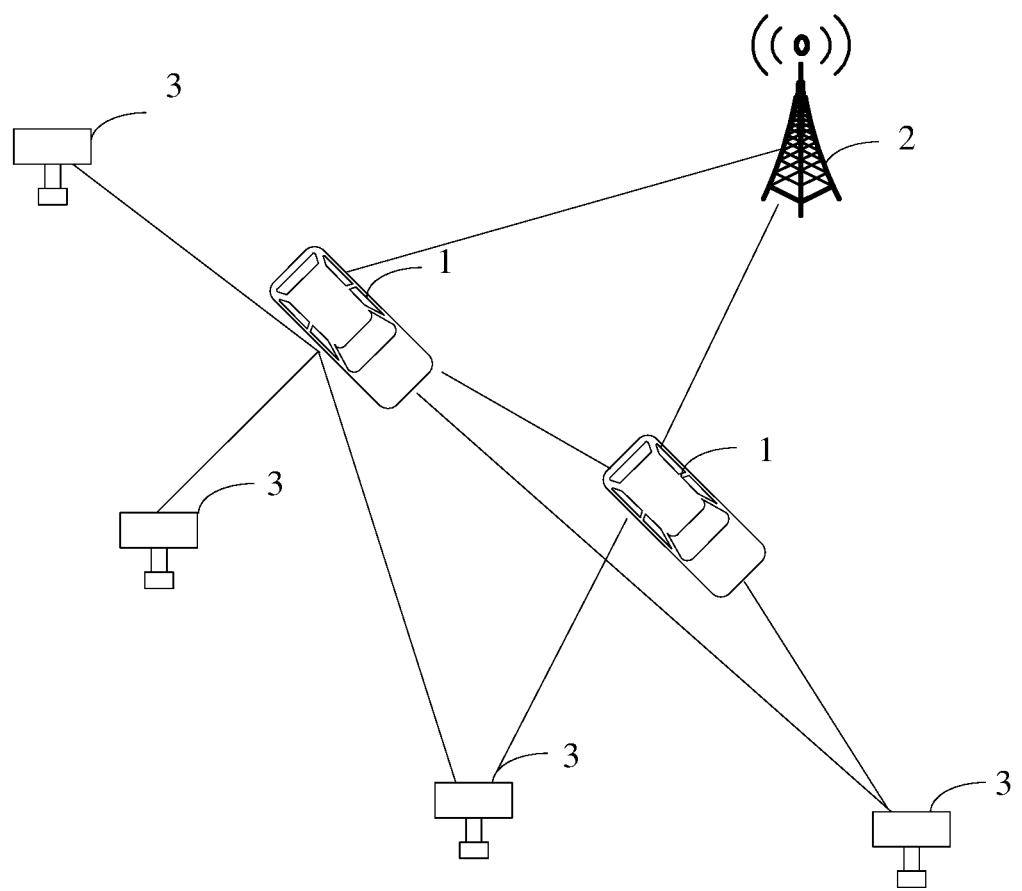
FIG. 1 is a schematic diagram of an application scenario of a method for positioning a communication device in accordance with an embodiment of the present application.

FIG. 1 is a schematic diagram of an application scenario of a method for positioning a communication device in accordance with an embodiment of the present application. As shown in FIG. 1, the scenario may include vehicles 1, a base station 2 and satellites 3, wherein the vehicles 1 are vehicles with certain communication functions. The vehicles 1 can receive signals from the satellites 3 and the base station 2, or send signals to the base station 2, and the vehicles can also communicate with each other. It should be noted that FIG. 1 is only a schematic diagram of a possible scenario provided by the present embodiment, and is not a limitation to the application scenario. The method for positioning a communication device can also be applied to scenarios for positioning mobile communication devices such as boats, unmanned aerial vehicles and airplanes. Optionally, the scenario may include vehicles and satellites without a base station, or include vehicles and a base station without satellites, and the present application is not limited thereto.

The technical schemes of the present application and how the above technical problem is solved by the technical schemes of the present application will be described in detail below through embodiments in conjunction with the drawings. The following several specific embodiments may be combined with each other, and same or similar concepts or processes may not be described repeatedly in some embodiments. It should be noted that in a method for positioning a communication device provided by the present disclosure, an execution subject can be a computer device or a vehicle. The execution subject can also be a device for positioning a communication device, wherein the device can implement part or all of the positioning of the communication device by software, hardware or a combination of software and hardware.

Figure 2:
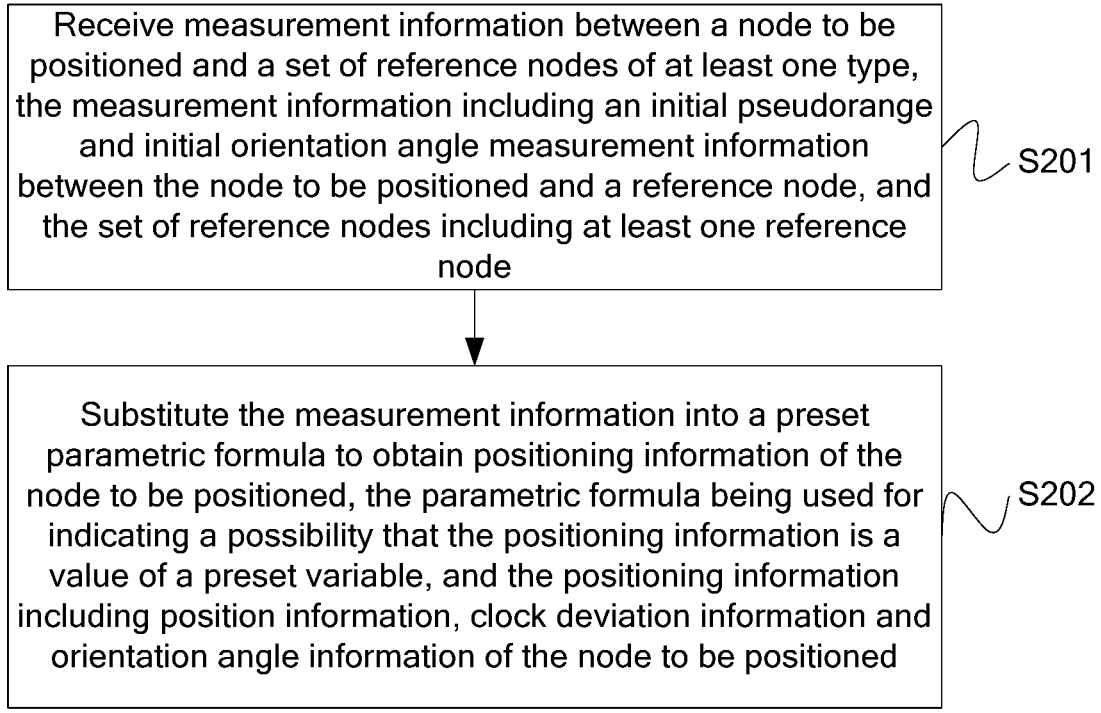
FIG. 2 is a flow chart of a method for positioning a communication device in accordance with an embodiment of the present application.

FIG. 2 is a flow chart of a method for positioning a communication device in accordance with an embodiment of the present application. This embodiment relates to a specific implementation process of positioning a node according to measurement information between the node to be positioned and a reference node in combination with a parametric formula. As shown in FIG. 2, the method includes steps S201 and S202.

In S201, measurement information between a node to be positioned and a set of reference nodes of at least one type is received, the measurement information including an initial pseudorange and initial orientation angle measurement information between the node to be positioned and a reference node, and the set of reference nodes including at least one reference node.

The node to be positioned can be a mobile communication device such as a vehicle, boat or unmanned aerial vehicle, and the reference node can be a base station, satellite, or vehicle, etc. The set of reference nodes can include one reference node, for example, the set of reference nodes includes one base station. The set of reference nodes can include a plurality of reference nodes, for example, the set of reference nodes includes 6 satellites, 2 base stations and 10 vehicles. The measurement information is used to represent information such as a distance and an orientation angle between the node to be positioned and the reference node. In this embodiment, the measurement information includes the initial pseudorange and initial orientation angle measurement information. Optionally, the initial orientation angle measurement information includes a pitch angle and/or azimuth angle of the node to be positioned relative to the reference node. Optionally, the measurement information may also include an initial position, initial clock deviation and initial orientation angle of the vehicle.

In this embodiment, the measurement information can be calculated according to the position information and signals of each node. For example, coordinate information of each node is determined in the world coordinate system, and a pseudorange and an orientation angle between two nodes are calculated according to the coordinate information. The measurement information may be measurement information of a plurality of nodes acquired by a computer device, or measurement information of each node acquired by the node.

Taking the application scenario in FIG. 1 as an example below, it is assumed that there are $N_c$ vehicles, $N_b$ base stations and $N_s$ satellites in a network, and positions of the base stations and satellites are known. Sets of vehicles, base stations and satellites are defined as follows: $N_c = \{1, 2, \ldots, N_c\}$, $N_b = \{N_c+1, N_c+2, \ldots, N_c+N_b\}$ and $N_s = \{N_c+N_b+1, N_c+N_b+2, \ldots, N_c+N_b+N_s\}$. The node vehicles, base stations and satellites can all be regarded as nodes. The position of a node 1 is $p_i = [x_i, y_i, z_i]^T$, and a parameter vector containing positions of all the vehicles is $p = [p_1^T, p_2^T, \ldots, p_i^T, \ldots, p_{N_c}^T]^T$.

We assume that the satellites and the base stations are all synchronous. For a vehicle i, due to the limitation of hardware equipment, there is a clock synchronization deviation $\delta_i$ between the vehicle i and the satellites and the base stations. A distance $d_{ij}$ from the node i to a node j, a pitch angle $\overline{\theta}_{ij}$ and an azimuth angle $\overline{\phi}_{ij}$ can be calculated using the following formulas respectively:

$$d_{ij} = \|p_i - p_j\|, \quad (4)$$

$$\overline{\theta}_{ij} = \cos^{-1}\frac{z_i - z_j}{d_{ij}}, \quad (5)$$

$$\overline{\phi}_{ij} = \tan^{-1}\frac{y_i - y_j}{x_i - x_j} - \phi_i, \quad (6)$$

wherein $\phi_i$ is an orientation angle of the node i.

In this embodiment, a signal received by the vehicle i from the node j can be expressed using a formula (7):

$$r_{ij}(t) = \alpha_{ij} s_i(t - \tau_{ij}) + n_{ij}(t) \quad (7),$$

wherein $s_i(t)$ is a known signal, a Fourier transform of which is $S_i(f)$, $\alpha_{ij}$ and $\tau_{ij}$ are respectively a signal amplitude and a delay of a transmission link from the node i to the node j, and $n_{ij}(t)$ is Gaussian white noise with a power spectral density of $N_0/2$.

In this embodiment, for the signal received by the vehicle i from the node j, we calculate a pseudorange using the following pseudorange model formula (8):

$$\tilde{d}_{ij} = d_{ij} + b_i - b_j + \omega_{ij} \quad (8),$$

wherein a distance deviation caused by a clock deviation is $b_i = c^* \delta_i$, C is the speed of light, $\delta_i$ is a clock synchronization deviation between the node i and a reference anchor (satellite or base station), $\omega_{ij}$ is an equivalent zero-mean Gaussian error caused by signal noise $n_{ij}(t)$, and for the base station or satellite j, $b_j = 0$ accordingly since it is assumed that they are synchronous. A variance $\sigma_{ij}$ of $\omega_{ij}$ satisfies:

$$1/\sigma_{ij}^2 = \frac{8\pi^2 |\alpha_{ij}|^2}{c^2 N_0} \int_{-\infty}^{\infty} f^2 |S_j(f)|^2 df,$$

a parameter $\lambda_{ij}$ is introduced here to represent a reciprocal of a noise variance, and its expression is as follows:

$$\lambda_{ij} = \frac{1}{\sigma_{ij}^2}, \; j \in N_s \cup N_c \cup N_b.$$

It can be seen from this expression that the variance is inversely proportional to signal-to-noise ratio and equivalent bandwidth.

In S202, the measurement information is substituted into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

The parametric formula is preset and used to indicate a possibility that the positioning information of the node to be positioned is the value of a preset variable, and the parametric formula can be a preset likelihood function, cost function, or probability function, etc. Preset variables can include variables such as a position, an orientation angle, and a clock deviation.

In this embodiment, the parametric formula can be established in advance, and then values of some preset variables can be given, and the values of the preset variables can be substituted into the parametric formula. The possibility that the positioning information of the node to be positioned is the given value of a preset variable is determined through a value of the parametric formula, and the value of the preset variable with the greatest possibility is determined as the positioning information of the node to be positioned. For example, if the parametric formula is a likelihood function, the values of the preset variables are substituted into the likelihood function. The larger the value of the likelihood function, the closer the value of the preset variable is to the positioning information.

In the method for positioning a communication device in accordance with this embodiment, measurement information between a node to be positioned and a set of reference nodes of at least one type is received, and the measurement information is substituted into a preset parametric formula to obtain the positioning information of the node to be positioned. As the measurement information is substituted into the parametric formula, the possibility that the positioning information is the value of a preset variable is determined, and the value of the preset variable with the greatest possibility is determined as the positioning information, thereby improving the positioning precision. Moreover, the measurement information includes not only an initial pseudorange between the node to be positioned and the reference node, but also initial orientation angle measurement information between the node to be positioned and the reference node, so as to obtain the positioning information including the position information, clock deviation information and orientation angle information of the node to be positioned, such that not only the position of the node can be determined, but also status information such as a clock deviation and an orientation angle of the node can be determined, thereby meeting the requirements of the Internet of Vehicles effectively.

In some scenarios, at least four base stations or satellites are required to implement the OTDOA-based positioning and the A-GNSS-based positioning, and this often cannot be satisfied in practice, due to the influence of environments such as sheltering of high buildings. In addition, there is co-channel interference between base stations, and the number of base stations that can be used in practice is often no more than four, so the system robustness is insufficient. To address this problem, the satellites and the base stations can be combined to improve the system robustness. Optionally, the set of reference nodes includes at least four first-type nodes and/or at least one second-type node. The first-type nodes are used to send signals and do not receive signals; the second-type node is used to send signals, receive signals and process signal arrays. The first-type nodes can be satellites, and the second-type node can be a base station. Optionally, the set of reference nodes also includes a vehicle.

In this embodiment, both satellites and a base station can be included in the set of reference nodes. On the one hand, the method in accordance with this embodiment can improve the system robustness by combining measurements of the satellites and the base station. On the other hand, since mutual pseudorange measurement and angle measurement between the vehicle and the base station are performed, the method in accordance with this embodiment can implement positioning even when there is only one base station, thereby improving the system robustness greatly. On the further hand, in this embodiment, satellite pseudoranges, mutual pseudorange and orientation angle measurement between the vehicle and the base station, and mutual pseudorange and orientation angle measurement between the vehicles are combined, thereby improving the positioning precision greatly compared with the single positioning scheme in the 3GPP.

On the basis of the above embodiments, when the parametric formula is constructed, a relationship between different variables can be set to construct the parametric formula. In this application, since the positioning information includes three types of information: position information, clock deviation information and orientation angle information of the node to be positioned, the parametric formula provided by the embodiment of the present application is a relational expression including a position variable, a clock deviation variable and an orientation angle variable of the node. Further, since the set of reference nodes can include a plurality of reference nodes, the above variables can be in the form of vectors. Optionally, the position variable is a vector containing position information of a plurality of nodes, the clock deviation variable is a vector containing clock deviation information of a plurality of nodes, and the orientation angle variable is a vector containing orientation angle information of a plurality of nodes.

Further, in combination with the embodiment shown in FIG. 2, a parametric formula of a relational expression including the position variable, the clock deviation variable and the orientation angle variable of a node can be constructed according to a method of calculating a pseudorange and a method of calculating an orientation angle. Optionally, the parametric formula is as follows:

$$f(z \mid p, b, \phi) \propto \exp\left\{-\sum_{i \in N_c} \sum_{k \in N_s} \lambda_{ik}(\|p_i - p_k\| + b_i - \tilde{d}_{ik})^2 - \sum_{i \in N_c + N_b} \sum_{k \in N_c + N_b} [\lambda_{ik}(\|p_i - p_k\| + b_i - b_k - \tilde{d}_{ik})^2 + ([\tilde{\theta}_{ik} \tilde{\phi}_{ik}] - [\bar{\theta}_{ki} \bar{\phi}_{ik}])C_{ik}^{-1}([\tilde{\theta}_{ik} \tilde{\phi}_{ik}] - [\bar{\theta}_{ki} \bar{\phi}_{ik}])^T]\right\}, \quad (1)$$

wherein a position parameter vector of every node i to be positioned is $p=[p_1^T, p_2^T, \ldots, p_i^T, \ldots, p_{N_c}^T]^T$, a clock deviation parameter vector between the node i to be positioned and the reference node is $b=[b_1, b_2, \ldots, b_i, \ldots b_{N_c}]$, an orientation angle parameter vector between the node i to be positioned and the reference node is $\phi=[\phi_1, \phi_2, \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c^*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\bar{\theta}_{ki} = \cos^{-1}\frac{z_k - z_i}{d_{ik}},$$

an azimuth angle of the node i to be positioned relative to the reference node k is $$\bar{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

The parametric formula provided in this embodiment is a likelihood function constructed according to the relational expression of the position variable, the clock deviation variable and the orientation angle variable of a node. The maximum value of the likelihood function needs to be found, and the purpose of this method is to find suitable p, b and ϕ which make a value of the above likelihood function maximum.

In this embodiment, since the pseudorange and the orientation angle between the node to be positioned and the reference node are involved in the parametric formula, the pseudorange and the orientation angle can be modeled first, and then the parametric formula can be constructed according the pseudorange modeling and the orientation angle modeling. In the embodiment shown in FIG. 2, the pseudorange modeling is shown in the formula (8), and the process of orientation angle modeling will be described below.

Figure 3:
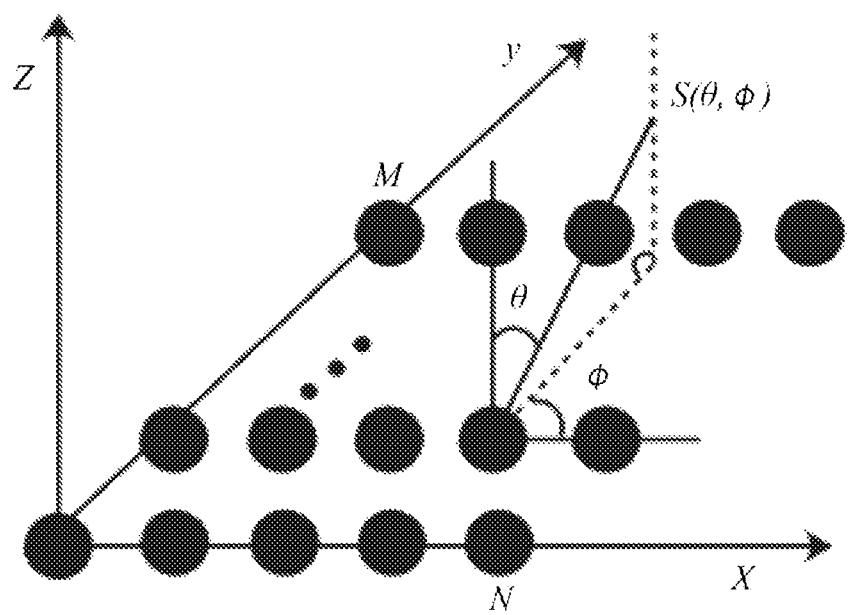
FIG. 3 is a schematic diagram of angle measurement in a rectangular array in accordance with an embodiment.

In this embodiment, the orientation angle modeling is described by taking a vehicle and a base station as an example. For the vehicle and the base station, we consider a property that an angle can be measured. The pitch angle $\hat{\theta}_{jk} \in (0, \pi)$ and azimuth angle $\hat{\phi}_{jk} \in (0, 2\pi)$ of the node $k \in N_c \cup N_b$ are measured by the node $j \in N_c \cup N_b$, then the orientation angle modeling is as follows:

$$[\tilde{\theta}_{jk} \tilde{\phi}_{jk}]^T = [\bar{\theta}_{jk} \bar{\phi}_{jk}]^T + \mu_{jk} \qquad (9),$$

wherein $\mu_{jk}$ is equivalent zero-mean Gaussian noise at a two-dimensional orientation angle caused by signal noise, and its covariance matrix is $C_{jk}$. $C_{jk}$ is inversely proportional to signal-to-noise ratio, but its specific form is related to a spatial structure of an array (such as a rectangular array, a circular array, etc.). Taking the rectangular array in FIG. 3 as an example, when an angle of the array in this figure is measured, $$\text{let } m = \frac{MN(N-1)(2N-1)}{6},$$

$$n = \frac{MN(M-1)(2M-1)}{6}, l = \frac{MN(N-1)(N-1)}{4},$$

Δ is an interval between elements of the array in the figure, and λ is a signal wavelength, then an inverse matrix of the covariance matrix $C_{jk}$ is:

$$C_{jk}^{-1} = \frac{8\pi^2 \alpha_{kj}^2 \Delta^2 \int_{-\infty}^{\infty} |S_j(f)|^2 df}{N_0 \lambda^2}\begin{pmatrix} a & b \\ b & d \end{pmatrix}, \qquad (10)$$

wherein $a = m \cos^2\bar{\phi}_{jk} + n \sin^2\bar{\phi}_{jk} + 2l \cos\bar{\phi}_{jk} \sin\bar{\phi}_{jk}$,
$b = \cos\bar{\theta}_{jk} \sin\bar{\theta}_{jk}((n-m)\cos\bar{\phi}_{jk}\sin\bar{\phi}_{jk} + l(\cos^2\bar{\phi}_{jk} - \sin^2\bar{\phi}_{kj}))$,
$d = \sin^2\bar{\theta}_{jk}(m \sin^2\bar{\phi}_{jk} + n \cos^2\bar{\phi}_{jk} - 2l \cos\bar{\phi}_{jk} \sin\bar{\phi}_{jk})$.

Figure 4:
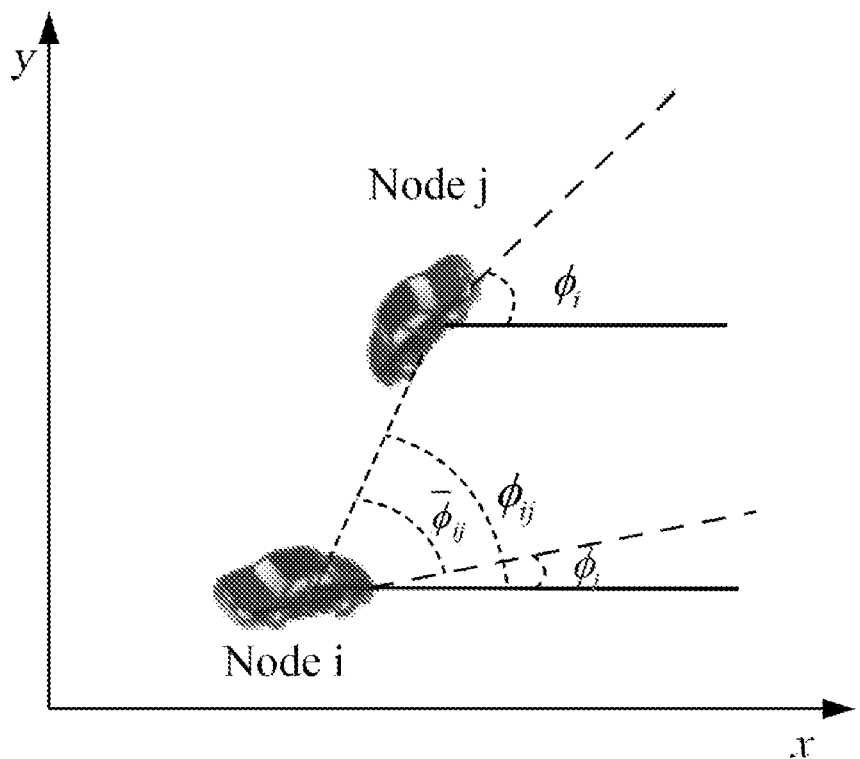
FIG. 4 is a schematic diagram of a vehicle orientation angle in accordance with an embodiment.
Figure 5:
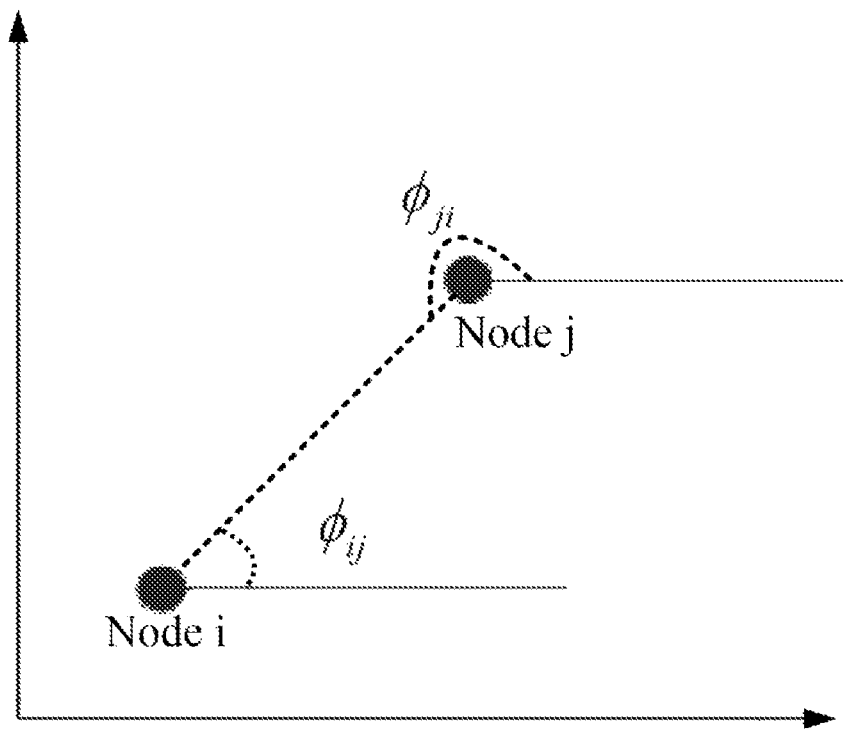
FIG. 5 is a schematic diagram of node angle measurement relationship in accordance with an embodiment.

Herein, an orientation angle of the base station k is $\phi_k=0$ by default, an azimuth angle of the vehicle i is defined as $\phi_i$, an azimuth angle from the node j to the node i in the local reference system of the vehicle i is defined as $\bar{\phi}_{ij}$ and an azimuth angle from the node j to the node i in the world reference system is defined as $\phi_{ij}$, as shown in FIG. 4. A relationship between the orientation angles of the vehicle nodes satisfies a formula (11) and a formula (12). Further, it can be concluded, according to FIGS. 5 and 6, that the relationship between $\phi_{ij}$ and $\phi_{ji}$ satisfies a formula (13):

$$\bar{\phi}_{ij} = \phi_{ij} - \phi_i \qquad (11),$$

$$\bar{\phi}_{ji} = \phi_{ji} - \phi_j \qquad (12),$$

$$\phi_{ij} = \phi_{ji} - \phi \qquad (13),$$

The specific process of constructing the parametric formula (1) according to the pseudorange modeling (8) and the orientation angle modeling (9) is emphatically described below. For the pseudorange measurement in the formula (8), its likelihood function is:

$$f(\tilde{d}_{ik}|p,b,\phi) \propto \exp\{-\lambda_{ik}(\|p_i - p_k\| + b_i - \tilde{d}_{ik})^2\}$$

For the orientation angle measurement in the formula (9), its likelihood function is:

$$f([\tilde{\theta}_{ik} \tilde{\phi}_{ik}]|p,b,\phi) \propto \exp\{-([\tilde{\theta}_{ik} \tilde{\phi}_{ik}] - [\bar{\theta}_{ik} \bar{\phi}_{ik}])C_{ik}^{-1}([\tilde{\theta}_{ik} \tilde{\phi}_{ik}] - [\bar{\theta}_{ik} \bar{\phi}_{ik}])^T\}$$

Since different variable measurements are independent of one another, after all variable measurements are combined, their overall likelihood function is the product of the likelihood functions of all the variable measurements. Since the likelihood functions of all the variable measurements are in exponential form, the product is in the form of a sum of exponential terms as shown in the following formula (1):

$$f(z|p,b,\phi) \propto \exp\left\{-\sum_{i \in N_c}\sum_{k \in N_s}\lambda_{ik}(\|p_i - p_k\| + b_i - \tilde{d}_{ik})^2 - \sum_{i \in N_c+N_b}\sum_{k \in N_c+N_b}[\lambda_{ik}(\|p_i - p_k\| + b_i - b_k - \tilde{d}_{ik})^2 + ([\tilde{\theta}_{ik}\tilde{\phi}_{ik}] - [\bar{\theta}_{ki}\bar{\phi}_{ik}])C_{ik}^{-1}([\tilde{\theta}_{ik}\tilde{\phi}_{ik}] - [\bar{\theta}_{ki}\bar{\phi}_{ik}])^T]\right\} \qquad (1)$$

It should be noted that the above formula (1) is only one possible implementation form of the parametric formula, and formulas including the above formula (1) and variants of the above formula (1) shall all fall within the protection scope of the present application.

In some scenarios, the positioning information of the node to be positioned can also be determined through a cost function. Optionally, the substituting the measurement information into the preset parametric formula to obtain the positioning information of the vehicle in S202 includes substituting the measurement information into the cost function corresponding to the parametric formula to obtain the positioning information of the node to be positioned, the cost function being used for indicating the possibility that the positioning information is the value of a preset variable.

In this embodiment, the cost function can be constructed with the relational expression of the position variable, the clock deviation variable and the orientation angle variable of a node, and the positioning information of the node can be determined through the cost function, or on the basis of the above formula (1), the cost function corresponding to the formula (1) can be directly constructed to determine the possibility that the positioning information is the value of a preset variable.

Optionally, based on the above gradient expression, the step of substituting the measurement information into the cost function corresponding to the parametric formula to obtain the positioning information of the vehicle includes: by using a gradient descent algorithm, substituting the measurement information into the cost function corresponding to the parametric formula for iterative operation until the cost function meets a preset convergence condition, and determining an iterative parameter corresponding to the cost function that meets the convergence condition as the positioning information of the vehicle; wherein the convergence condition is that a value of the cost function is the minimum or the maximum number of iterations is reached; the iterative parameter is the value of a preset variable obtained according to the iterative operation.

In this embodiment, by using the gradient descent algorithm, the measurement information is substituted into the cost function corresponding to the parametric formula for iterative operation. A group of values of p, b and ϕ will be obtained in every iterative operation, the values of p, b and ϕ are substituted into the cost function, and the values of p, b and ϕ which minimize the value of the cost function are determined as the positioning information of the node to be positioned, or the values of p, b and ϕ calculated when the maximum number of iterations is reached are determined as the positioning information of the node to be positioned.

An implementation of "substituting the measurement information into the cost function corresponding to the parametric formula to obtain the positioning information of the node to be positioned" will be described below through a centralized positioning method and a distributed positioning method respectively.

The centralized positioning method refers to a process in which when there is a plurality of nodes to be positioned, the positioning information of each of the nodes to be positioned can be calculated centrally by a computer device. Optionally, if the nodes to be positioned include at least two nodes, the cost function is:

$$H(z|p,b,\phi) = \sum_{i \in N_c} \sum_{k \in N_s} \lambda_{ik} (\|p_i - p_k\| + b_i - \tilde{d}_{ik})^2 + \quad (2)$$
$$\sum_{i \in N_c + N_b} \sum_{k \in N_c + N_b} [\lambda_{ik} (\|p_i - p_k\| + b_i - b_k - \tilde{d}_{ik})^2 +$$
$$([\tilde{\theta}_{ik} \tilde{\phi}_{ik}] - [\bar{\theta}_{ki} \bar{\phi}_{ik}]) C_{ik}^{-1} ([\tilde{\theta}_{ik} \tilde{\phi}_{ik}] - [\bar{\theta}_{ki} \bar{\phi}_{ik}])^T],$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2, \ldots, b_i, \ldots b_{N_c}]$, an orientation angle parameter vector between the node i to be positioned and the reference node is $\phi=[\phi_1, \phi_2, \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\bar{\theta}_{ki} = \cos^{-1} \frac{z_k - z_i}{d_{ik}},$$

an azimuth angle of the node i to be positioned relative to the reference node k is $$\bar{\phi}_{ik} = \tan^{-1} \frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $c_{ik}^{-1}$ is an inverse matrix of a covariance matrix of gaussian noise.

In this embodiment, the formula (2) is the cost function of the formula (1), and the above likelihood function (1) is in the form of an exponential function, so its exponential terms need to be maximized, that is, to make the value of the following cost function H(p, b, ϕ) minimum. H(p, b, ϕ) is in the form of a weighted sum of squares, and can be divided into two portions, one can be pseudorange and orientation angle information of the anchor nodes (satellites and base station), and the other can be pseudorange and orientation angle information of other neighboring vehicles. The purpose of this method is to minimize calculation to make deviation between the calculated pseudorange and orientation angle value and the measured pseudorange and orientation angle minimum. The above cost function (2) is in the form of a centralized algorithm since it contains the measurement information of all the nodes, that is, all the measurement information is collected for calculation.

Specifically, the commonly used gradient descent algorithm can be used to find the minimum value of the cost function. For the gradient descent algorithm, the gradient (i.e., the first derivative) of the typical terms in the centralized cost function (2) with respect to p, b, ϕ can be given. For each measurement item in H(p, b, ϕ), it indicates that it is related to the parameters $p_i, p_k, b_i, b_k, \phi_i$ of the node i to be positioned. For the pseudorange measurement, a gradient expression is described herein by taking the node i and the node k as an example:

$$\frac{\partial \lambda_{ik} \left( \begin{array}{c} p_i - p_k + b_i - \\ b_k - \tilde{d}_{ik} \end{array} \right)^2}{\partial p_i} = \frac{2\lambda_{ik} \left( \begin{array}{c} p_i - p_k + b_i - \\ b_k - \tilde{d}_{ik} \end{array} \right)}{p_i - p_k} (p_i - p_k), \quad (14)$$

-continued $$\frac{\partial \lambda_{ik}\left(\begin{array}{c}p_i - p_k + b_i - \\ b_k - \tilde{d}_{ik}\end{array}\right)^2}{\partial p_k} = \frac{2\lambda_{ik}\left(\begin{array}{c}p_i - p_k + b_i - \\ b_k - \tilde{d}_{ik}\end{array}\right)}{p_i - p_k}(p_k - p_i), \quad (15)$$

$$\frac{\partial \lambda_{ik}\left(\begin{array}{c}p_i - p_k + b_i - \\ b_k - \tilde{d}_{ik}\end{array}\right)^2}{\partial b_i} = 2\lambda_{ik}(p_i - p_k + b_i - b_k - \tilde{d}_{ik}), \quad (16)$$

$$\frac{\partial \lambda_{ik}\left(\begin{array}{c}p_i - p_k + b_i - \\ b_k - \tilde{d}_{ik}\end{array}\right)^2}{\partial b_k} = -2\lambda_{ik}(p_i - p_k + b_i - b_k - \tilde{d}_{ik}), \quad (17)$$

For the orientation angle measurement of the node i and the node k, the following formula is defined first:

$$\frac{\partial[\bar{\theta}_{ik}\bar{\phi}_{ik}]}{\partial p_i} = \begin{bmatrix} \frac{(z_i - z_k)(x_i - x_k)}{d_{kj}^2\sqrt{(x_i - x_k)^2 + (y_i - y_k)^2}} & \frac{-(y_i - y_k)}{(x_i - x_k)^2 + (y_i - y_k)^2} \\ \frac{(z_i - z_k)(y_i - y_k)}{d_{kj}^2\sqrt{(x_i - x_k)^2 + (y_i - y_k)^2}} & \frac{(x_i - x_k)}{(x_i - x_k)^2 + (y_i - y_k)^2} \\ \frac{-\sqrt{(x_i - x_k)^2 + (y_i - y_k)^2}}{d_{kj}^2} & 0 \end{bmatrix}, \quad (18)$$

then the gradient of the orientation angle measurement term with respect to the position is:

$$\frac{\partial\left([\tilde{\theta}_{ik}\tilde{\phi}_{ik}] - [\bar{\theta}_{ik}\bar{\phi}_{ik}]\right)C_{ik}^{-1}\left([\tilde{\theta}_{ik}\tilde{\phi}_{ik}] - [\bar{\theta}_{ik}\bar{\phi}_{ik}]\right)^T}{\partial p_i} = \frac{\partial[\bar{\theta}_{ik}\bar{\phi}_{ik}]}{\partial p_i} * 2C_{ik}^{-1}\left([\bar{\theta}_{ik}\bar{\phi}_{ik}] - [\tilde{\theta}_{ik}\tilde{\phi}_{ik}]\right)^T \quad (19)$$

$$\frac{\partial\left([\tilde{\theta}_{ik}\tilde{\phi}_{ik}] - [\bar{\theta}_{ik}\bar{\phi}_{ik}]\right)C_{ik}^{-1}\left([\tilde{\theta}_{ik}\tilde{\phi}_{ik}] - [\bar{\theta}_{ik}\bar{\phi}_{ik}]\right)^T}{\partial p_k} = -\frac{\partial\left([\tilde{\theta}_{ik}\tilde{\phi}_{ik}] - [\bar{\theta}_{ik}\bar{\phi}_{ik}]\right)C_{ik}^{-1}\left([\tilde{\theta}_{ik}\tilde{\phi}_{ik}] - [\bar{\theta}_{ik}\bar{\phi}_{ik}]\right)^T}{\partial p_i}. \quad (20)$$

The gradient of the orientation angle measurement item with respect to the orientation angle is:

$$\frac{\partial\left([\tilde{\theta}_{ik}\tilde{\phi}_{ik}] - [\bar{\theta}_{ik}\bar{\phi}_{ik}]\right)C_{ik}^{-1}\left([\tilde{\theta}_{ik}\tilde{\phi}_{ik}] - [\bar{\theta}_{ik}\bar{\phi}_{ik}]\right)^T}{\partial \phi_i} = [0, -1] * 2C_{ik}^{-1}\left([\bar{\theta}_{ik}\bar{\phi}_{ik}] - [\tilde{\theta}_{ik}\tilde{\phi}_{ik}]\right)^T. \quad (21)$$

Based on the above gradient function expression, as shown in FIG. 7, the step of by using the gradient descent algorithm, substituting the measurement information into the cost function corresponding to the parametric formula for iterative operation may include steps S301 and S302.

In S301, the measurement information is substituted into a gradient expression corresponding to the cost function for iterative operation, and an iterative parameter in the m-th iteration of the node to be positioned is acquired, m being an integer greater than or equal to 0.

In S302, an iterative parameter in the (m+1)-th iteration of the node to be positioned is calculated using the gradient expression according to the iterative parameter in the m-th iteration and the cost function.

In this embodiment, iterative parameters can be the values of the position vector, the clock deviation vector and the orientation angle vector. Every time the measurement information is substituted into the gradient expression corresponding to the cost function for iterative operation, a group of values of the position vector, the clock deviation vector and the orientation angle vector can be calculated. The group of values of the position vector, the clock deviation vector and the orientation angle vector are substituted into the cost function. If the cost function reaches the maximum value, the group of values of the position vector, the clock deviation vector and the orientation angle vector are determined as the positioning information; if the cost function does not reach the maximum value, the group of values of the position vector, the clock deviation vector and the orientation angle vector are substituted into the gradient expression to continue the iteration till the value of the cost function is the maximum or the maximum number of iterations is reached.

In the method for positioning a communication device in accordance with this embodiment, the measurement information is substituted into the gradient expression corresponding to the cost function for iterative operation, an iterative parameter in the m-th iteration of the node to be positioned is acquired, and an iterative parameter in the (m+1)-th iteration of the node to be positioned is calculated using the gradient expression according to the iterative parameter in the m-th iteration and the cost function. Because the iteration is carried out through gradient descent in the above algorithm, and a closed-form expression is given for the gradient portion, the processing is easy for hardware calculation and the complexity is low.

In a mobile network, in order to maintain real-time performance, all data cannot be collected to a central point for calculation in most cases, and the computing capability of most nodes cannot calculate the parameters of all nodes in real time. Therefore, it is needed to design a distributed method, that is, each node i to be positioned only calculates its own $p_i$, $b_i$, $\phi_i$, and the terms related to the node i to be positioned can be extracted from the formula (2) of the overall cost function to construct a local cost function $H_i(p_i, b_i, \phi_i)$. Optionally, if the node to be positioned includes one node, the cost function is:

$$H_i(p_i, b_i, \phi_i) = \sum_{k \in N_s} \lambda_{ik}\left(\|p_i - p_k\| + b_i - \tilde{d}_{ik}\right)^2 + \sum_{k \in N_c + N_b}\left[\lambda_{ik}\left(\|p_i - p_k\| + b_i - b_k - \tilde{d}_{ik}\right)^2 + \left([\tilde{\theta}_{ik}\tilde{\phi}_{ik}] - [\bar{\theta}_{ik}\bar{\phi}_{ik}]\right)C_{ik}^{-1}\left([\tilde{\theta}_{ik}\tilde{\phi}_{ik}] - [\bar{\theta}_{ik}\bar{\phi}_{ik}]\right)^T\right], \quad (3)$$

wherein a position parameter of the node i to be positioned is $p_i=[x_i, y_i, z_i]^T$, a position parameter vector of the reference node k is $p_k=[x_k, y_k, z_k]^T$, a clock deviation parameter between the node i to be positioned and the reference node is $b_i$, an orientation angle parameter of the node i to be positioned is $\phi_i$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\bar{\theta}_{ik} = \cos^{-1}\frac{z_k - z_i}{d_{ik}},$$

an azimuth angle of the node i to be positioned relative to the reference node k is $$\bar{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $c_{ik}^{-1}$ is an inverse matrix of a covariance matrix of gaussian noise.

Figure 8:
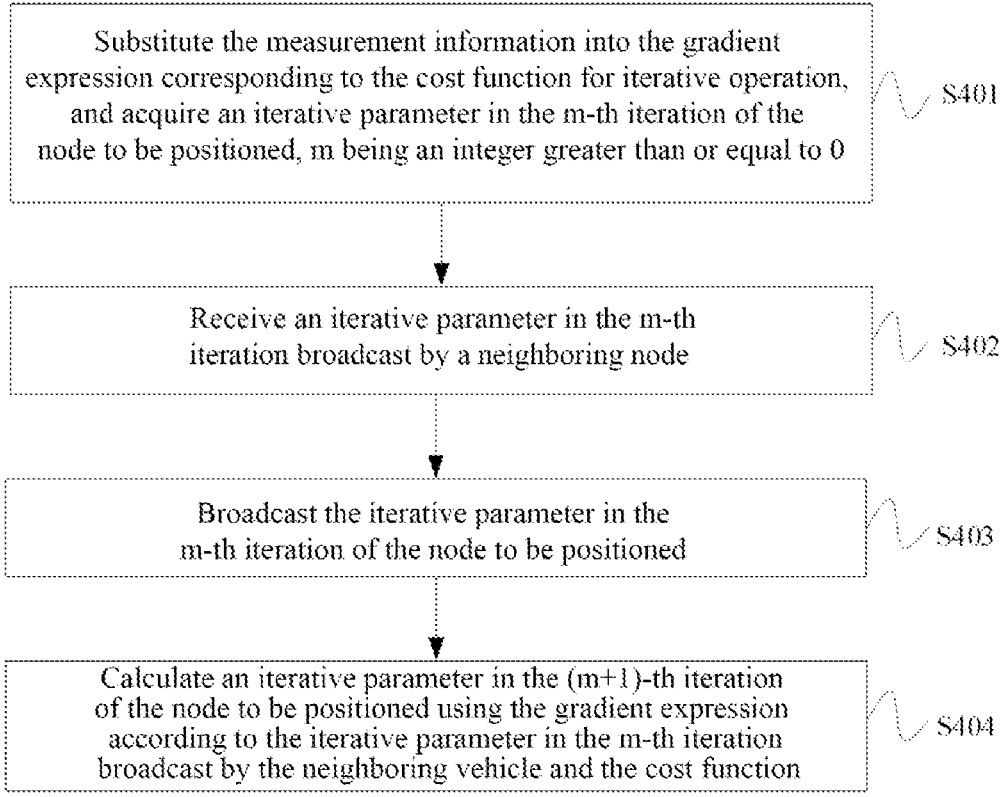
FIG. 8 is a flow chart of a method for positioning a communication device in accordance with yet another embodiment of the present application.

For the distributed method, as shown in FIG. 8, the step of by using the gradient descent algorithm, substituting the measurement information into the cost function corresponding to the parametric formula for iterative operation may include steps S401-S404.

In S401, the measurement information is substituted into the gradient expression corresponding to the cost function for iterative operation, and an iterative parameter in the m-th iteration of the node to be positioned is acquired, m being an integer greater than or equal to 0.

In S402, an iterative parameter in the m-th iteration broadcast by a neighboring node is received.

In S403, the iterative parameter in the m-th iteration of the node to be positioned is broadcast.

In S404, an iterative parameter in the (m+1)-th iteration of the node to be positioned is calculated using the gradient expression according to the iterative parameter in the m-th iteration broadcast by the neighboring vehicle and the cost function.

In this embodiment, different from the centralized method, the node to be positioned can receive an iterative parameter in the m-th iteration broadcast by another neighboring node, and calculate the iterative parameter in the (m+1)-th iteration of the node to be positioned using the gradient expression according to the iterative parameter in the m-th iteration broadcast by the neighboring vehicle and the cost function, and can broadcast the iterative parameter in the m-th iteration of the node to be positioned for another neighboring node to carry out positioning.

In the method for positioning a communication device in accordance with this embodiment, the measurement information is substituted into the gradient expression corresponding to the cost function for iterative operation, an iterative parameter in the m-th iteration of the node to be positioned is acquired, an iterative parameter in the m-th iteration broadcast by a neighboring node is received, the iterative parameter in the m-th iteration of the node to be positioned is broadcast, and an iterative parameter in the (m+1)-th iteration of the node to be positioned is calculated using the gradient expression according to the iterative parameter in the m-th iteration broadcast by the neighboring vehicle and the cost function, such that the real-time performance of the positioning of the communication device can be ensured and the requirements of the Internet of Vehicles are met.

It should be understood that although the steps in the flow charts of FIGS. 2-8 are shown in sequence as indicated by arrows, these steps are not necessarily performed in the order indicated by the arrows. Unless explicitly stated herein, the order of performing of these steps is not strictly limited, and these steps may be performed in other orders. Moreover, at least a part of the steps in FIGS. 2-5 may include multiple sub-steps or multiple stages, which may not be necessarily completed at the same time, but may be performed at different time. These sub-steps or stages may not necessarily be performed in sequence, but may be performed in turn or alternately with other steps or at least a part of the sub-steps or stages of the other steps.

Figure 9:
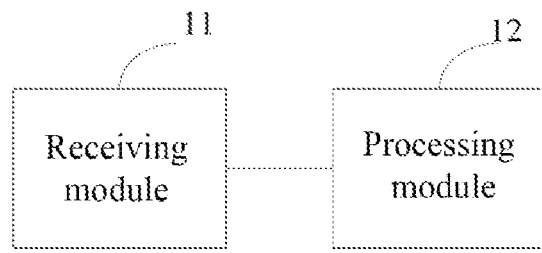
FIG. 9 is a block diagram of a device for positioning a communication device in accordance with an embodiment of the present application.

In one embodiment, as shown in FIG. 9, a device for positioning a communication device is provided, which includes: a receiving module 11 configured to receive measurement information between a node to be positioned and a set of reference nodes of at least one type, the measurement information including an initial pseudorange and initial orientation angle measurement information between the node to be positioned and a reference node, and the set of reference nodes including at least one reference node; and a processing module 12 configured to substitute the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

In one embodiment, the parametric formula is a relational expression including a position variable, a clock deviation variable and an orientation angle variable of a node.

In one embodiment, the position variable is a vector containing position information of a plurality of nodes, the clock deviation variable is a vector containing clock deviation information of a plurality of nodes, and the orientation angle variable is a vector containing orientation angle information of a plurality of nodes.

In one embodiment, the parametric formula is:

$$f(z \mid p, b, \phi) \propto \exp\left\{-\sum_{i \in N_c}\sum_{k \in N_s} \lambda_{ik}(\|p_i - p_k\| + b_i - \tilde{d}_{ik})^2 - \right.$$
$$\sum_{i \in N_c + N_b}\sum_{k \in N_c + N_b} [\lambda_{ik}(\|p_i - p_k\| + b_i - b_k - \tilde{d}_{ik})^2 +$$
$$\left. ([\tilde{\theta}_{ik}\tilde{\phi}_{ik}] - [\bar{\theta}_{ik}\bar{\phi}_{ik}])C_{ik}^{-1}([\tilde{\theta}_{ik}\tilde{\phi}_{ik}] - [\bar{\theta}_{ik}\bar{\phi}_{ik}])^T]\right\}, \quad (1)$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2, \ldots, b_i, \ldots b_{N_c}]$, an orientation angle parameter vector between the node i to be positioned and the reference node is $\phi=[\phi_1, \phi_2, \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\tilde{\theta}_{ik} = \cos^{-1}\frac{z_k - z_i}{d_{ik}},$$

an azimuth angle of the node i to be positioned relative to the reference node k is $$\tilde{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In one embodiment, substituting the measurement information into the preset parametric formula to obtain the positioning information of a vehicle includes: substituting the measurement information into a cost function corresponding to the parametric formula to obtain the positioning information of the node to be positioned, the cost function being used for indicating the possibility that the positioning information is the value of a preset variable.

In one embodiment, if nodes to be positioned include at least two nodes, the cost function is:

$$H(z \mid p, b, \phi) = \sum_{i \in N_c}\sum_{k \in N_s} \lambda_{ik}\left(\|p_i - p_k\| + b_i - \tilde{d}_{ik}\right)^2 + \qquad (2)$$

$$\sum_{i \in N_c+N_b}\sum_{k \in N_c+N_b} \left[\lambda_{ik}\left(\|p_i - p_k\| + b_i - b_k - \tilde{d}_{ik}\right)^2 + \right.$$

$$\left.\left(\left[\tilde{\theta}_{ik}\tilde{\phi}_{ik}\right] - \left[\bar{\theta}_{ik}\bar{\phi}_{ik}\right]\right)C_{ik}^{-1}\left(\left[\tilde{\theta}_{ik}\tilde{\phi}_{ik}\right] - \left[\bar{\theta}_{ik}\bar{\phi}_{ik}\right]\right)^T\right],$$

wherein a position parameter vector of every node i to be positioned is $p=[p_1^T, p_2^T, \ldots, p_i^T, \ldots, p_{N_c}^T]^T$, $p_i=[x_i, y_i, z_i]^T$, a clock deviation parameter vector between the node i to be positioned and the reference node is $b=[b_1, b_2 \ldots, b_i, \ldots b_{N_c}]$, an orientation angle parameter vector between the node i to be positioned and the reference node is $\phi=[\phi_1, \phi_2, \ldots, \phi_i, \ldots \phi_{N_c}]$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, $p_k$ is a position vector of the reference node, $p_k=[x_k, y_k, z_k]^T$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\tilde{\theta}_{ik} = \cos^{-1}\frac{z_k - z_i}{d_{ik}},$$

an azimuth angle of the node i to be positioned relative to the reference node k is $$\tilde{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In one embodiment, if the node to be positioned includes one node, the cost function is:

$$H_i(p_i, b_i, \phi_i) = \sum_{k \in N_s} \lambda_{ik}\left(\|p_i - p_k\| + b_i - \tilde{d}_{ik}\right)^2 + \qquad (3)$$

$$\sum_{k \in N_c+N_b} \left[\lambda_{ik}\left(\|p_i - p_k\| + b_i - b_k - \tilde{d}_{ik}\right)^2 + \right.$$

$$\left.\left(\left[\tilde{\theta}_{ik}\tilde{\phi}_{ik}\right] - \left[\bar{\theta}_{ik}\bar{\phi}_{ik}\right]\right)C_{ik}^{-1}\left(\left[\tilde{\theta}_{ik}\tilde{\phi}_{ik}\right] - \left[\bar{\theta}_{ik}\bar{\phi}_{ik}\right]\right)^T\right],$$

wherein a position parameter of the node i to be positioned is $p_i=[x_i, y_i, z_i]^T$, a position parameter vector of the reference node k is $p_k=[x_k, y_k, z_k]^T$, a clock deviation parameter between the node i to be positioned and the reference node is $b_i$, an orientation angle parameter of the node i to be positioned is $\phi_i$, and a set of nodes to be positioned is $N_c=\{1, 2, \ldots, N_c\}$; $N_b$ and $N_s$ are sets of reference nodes of different types, $N_b=\{N_c+1, N_c+2, \ldots, N_c+N_b\}$, $N_s=\{N_c+N_b+1, N_c+N_b+2, \ldots, N_c+N_b+N_s\}$, $\lambda_{ik}$ is a reciprocal of a noise variance, and a pseudorange between the node i to be positioned and the reference node k is $\tilde{d}_{ik}=d_{ik}+b_i-b_k+\omega_{ik}$, $d_{ik}=\|p_i-p_k\|$, a distance deviation caused by a clock deviation is $b_i=c*\delta_i$, c is the speed of light, $\delta_i$ is a clock synchronization deviation between the node i to be positioned and a reference anchor, $\omega_{ik}$ is a Gaussian error caused by signal noise, a pitch angle of the node i to be positioned relative to the reference node k in a coordinate system of the node i to be positioned is $$\tilde{\theta}_{ik} = \cos^{-1}\frac{z_k - z_i}{d_{ik}},$$

an azimuth angle of the node i to be positioned relative to the reference node k is $$\tilde{\phi}_{ik} = \tan^{-1}\frac{y_k - y_i}{x_k - x_i} - \phi_i, \tilde{\theta}_{ik}$$

is a measured value of the pitch angle of the node i to be positioned relative to the reference node k in the coordinate system of the node i to be positioned, $\tilde{\phi}_{ik}$ is a measured value of the azimuth angle of the node i to be positioned relative to the reference node k, and $C_{ik}^{-1}$ is an inverse matrix of a covariance matrix of gaussian noise.

In one embodiment, substituting the measurement information into the cost function corresponding to the parametric formula to obtain the positioning information of the vehicle includes: by using a gradient descent algorithm, substituting the measurement information into the cost function corresponding to the parametric formula for iterative operation until the cost function meets a preset convergence condition, and determining an iterative parameter corresponding to the cost function that meets the convergence condition as the positioning information of the vehicle; wherein the convergence condition is that a value of the cost function is the minimum or the maximum number of iterations is reached; the iterative parameter is the value of a preset variable obtained according to the iterative operation.

In one embodiment, by using the gradient descent algorithm, substituting the measurement information into the cost function corresponding to the parametric formula for iterative operation includes: substituting the measurement information into a gradient expression corresponding to the cost function for iterative operation, and acquiring an iterative parameter in the m-th iteration of the node to be positioned, m being an integer greater than or equal to 0; and calculating an iterative parameter in the (m+1)-th iteration of the node to be positioned by using the gradient expression according to the iterative parameter in the m-th iteration and the cost function.

In one embodiment, if the node to be positioned includes one node, the receiving module 11 is further configured to receive an iterative parameter in the m-th iteration broadcast by a neighboring node; and the processing module 12 is specifically configured to calculate an iterative parameter in the (m+1)-th iteration of the node to be positioned by using the gradient expression according to the iterative parameter in the m-th iteration broadcast by a neighboring vehicle and the cost function.

In one embodiment, the device further includes: a sending module configured to broadcast the iterative parameter in the m-th iteration of the node to be positioned.

In one embodiment, the set of reference nodes includes at least four first-type nodes and/or at least one second-type node; the first-type nodes are used to send signals and do not receive signals; the second-type node is used to send signals, receive signals and process signal arrays.

In one embodiment, the first-type nodes are satellites, and the second-type node is a base station.

In one embodiment, the set of reference nodes also includes a vehicle.

In one embodiment, the node to be positioned is a vehicle to be positioned.

In one embodiment, the initial orientation angle measurement information includes a pitch angle and/or azimuth angle of the node to be positioned relative to the reference node.

The implementation principle and technical effect of the device for positioning a communication device in accordance with the above embodiment are similar to those of the above method embodiment, and will not be repeated herein.

Specific limitations of the device for positioning a communication device may refer to the limitations of the method for positioning a communication device described above, and will not be repeated herein. Various modules in the device for positioning a communication device may be implemented in whole or in part by software, hardware, and combinations thereof. The various modules may be embedded in, or independent of, a processor in a computer device in the form of hardware, or may be stored in a memory in a computer device in the form of software, for the processor to invoke and execute operations corresponding to the various modules.

Figure 10:
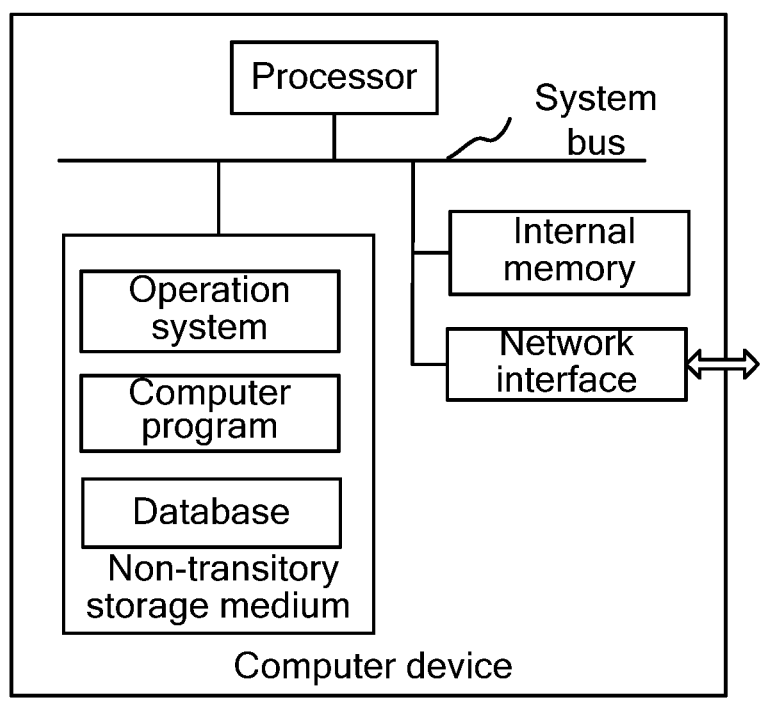
FIG. 10 is a block diagram of a computer device in accordance with an embodiment of the present application.

In one embodiment, a computer device is provided. The computer device may be a server, and a diagram of its internal structure may be as shown in FIG. 10. The computer device includes a processor, a memory, a network interface and a database which are connected via system buses. The processor of the computer device is used to provide computing and control capabilities. The memory of the computer device includes a non-transitory storage medium and an internal memory. An operating system, a computer program and a database are stored in the non-transitory storage medium. The internal memory provides an environment for operation of the operating system and the computer program in the non-transitory storage medium. The database of the computer device is used to store resources for querying and processing data. The network interface of the computer device is used to communicate with an external terminal through a network connection. When the computer program is executed by the processor, a method for positioning a communication device is implemented.

Those skilled in the art may understand that the structure shown in FIG. 10 is only a block diagram of a part of a structure related to the scheme of the present application, but does not constitute limitations to the computer device to which the scheme of the present application is applied. A specific computer device may include more or fewer components than those shown in the figure, or combine some components, or have different component arrangements.

In one embodiment, a computer device is provided, which includes a memory and a processor. The memory stores a computer program, and the processor implements the following steps when executing the computer program: receiving measurement information between a node to be positioned and a set of reference nodes of at least one type, the measurement information including an initial pseudorange and initial orientation angle measurement information between the node to be positioned and a reference node, and the set of reference nodes including at least one reference node; and substituting the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

The implementation principle and technical effect of the computer device in accordance with the above embodiment are similar to those of the above method embodiment, and will not be repeated herein.

In one embodiment, there is provided a computer readable storage medium having stored thereon a computer program. When the computer program is executed by a processor, the following steps are implemented: receiving measurement information between a node to be positioned and a set of reference nodes of at least one type, the measurement information including an initial pseudorange and initial orientation angle measurement information between the node to be positioned and a reference node, and the set of reference nodes including at least one reference node; and substituting the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

The implementation principle and technical effect of the computer readable storage medium in accordance with the above embodiment are similar to those of the above method embodiment, and will not be repeated herein.

Those of ordinary skill in the art can understand that all or part of the processes in the above method embodiments can be accomplished by instructing related hardware through a computer program, which may be stored in a non-transitory computer readable storage medium, and may include the processes in various method embodiments above when executed. Any reference to a memory, a storage, a database or other media used in the embodiments provided in the present application can include non-transitory and/or transitory memories. The non-transitory memory may include a Read Only Memory (ROM), a Programmable ROM (PROM), an Electrically Programmable ROM (EPROM), an Electrically Erasable Programmable ROM (EEPROM), or a flash memory. The transitory memory may include a random access memory (RAM) or an external cache memory. By way of illustration but not limitation, a RAM is available in various forms, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

Various technical features in the above embodiments can be combined arbitrarily. For the sake of brevity of the description, not all possible combinations of the technical features in the above embodiments are described. However, as long as there are no conflicts in the combinations of these technical features, they should be considered as falling within the scope specified in this specification. The embodiments described above only provide several implementations of the present application, and description thereof is relatively specific and detailed, but is not to be interpreted as limitations to the protection scope of the present disclosure. It should be noted that without departing from the conception of the present application, those of ordinary skill in the art may also make a number of variations and improvements, which shall fall into the protection scope of the present application. The protection scope of the present application is subject to the appended claims.

What is claimed is:

1. A method for positioning a communication device, comprising:
   receiving measurement information between a node to be positioned and a set of reference nodes of at least one type, the measurement information including an initial pseudorange and initial orientation angle measurement information between the node to be positioned and a reference node, and the set of reference nodes including at least one reference node; and
   substituting the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

2. The method according to claim 1, wherein the parametric formula is a relational expression including a position variable, a clock deviation variable and an orientation angle variable of a node.

3. The method according to claim 2, wherein the position variable is a vector containing position information of a plurality of nodes, the clock deviation variable is a vector containing clock deviation information of a plurality of nodes, and the orientation angle variable is a vector containing orientation angle information of a plurality of nodes.

4. The method according to claim 2, wherein the set of reference nodes comprises at least four first-type nodes and/or at least one second-type node; the first-type nodes are used to send signals and do not receive signals; the second-type node is used to send signals, receive signals and process signal arrays.

5. The method according to claim 4, wherein the first-type nodes are satellites, and the second-type node is a base station.

6. The method according to claim 5, wherein the set of reference nodes also comprises a vehicle.

7. The method according to claim 2, wherein the initial orientation angle measurement information comprises a pitch angle and/or an azimuth angle of the node to be positioned relative to the reference node.

8. The method according to claim 1, wherein substituting the measurement information into the preset parametric formula to obtain the positioning information of the node to be positioned comprises:
   substituting the measurement information into a cost function corresponding to the parametric formula to obtain the positioning information of the node to be positioned, the cost function being used for indicating the possibility that the positioning information is the value of the preset variable.

9. The method according to claim 8, wherein substituting the measurement information into the cost function corresponding to the parametric formula to obtain the positioning information of the node to be positioned comprises:
   by using a gradient descent algorithm, substituting the measurement information into the cost function corresponding to the parametric formula for iterative operation until the cost function meets a preset convergence condition, and determining an iterative parameter corresponding to the cost function that meets the convergence condition as the positioning information of the node to be positioned;
   wherein the convergence condition is that a value of the cost function is the minimum or the maximum number of iterations is reached; the iterative parameter is the value of the preset variable obtained according to the iterative operation.

10. The method according to claim 9, wherein by using a gradient descent algorithm, substituting the measurement information into the cost function corresponding to the parametric formula for iterative operation comprises:
    substituting the measurement information into a gradient expression corresponding to the cost function for iterative operation, and acquiring an iterative parameter in the m-th iteration of the node to be positioned, m being an integer greater than or equal to 0; and
    calculating an iterative parameter in the (m+1)-th iteration of the node to be positioned using the gradient expression according to the iterative parameter in the m-th iteration and the cost function.

11. The method according to claim 10, wherein if the node to be positioned comprises one node, the method further comprises:
receiving an iterative parameter in the m-th iteration broadcast by a neighboring node;
calculating the iterative parameter in the (m+1)-th iteration of the node to be positioned using the gradient expression according to the iterative parameter in the m-th iteration and the cost function comprises:
calculating the iterative parameter in the (m+1)-th iteration of the node to be positioned using the gradient expression according to the iterative parameter in the m-th iteration broadcast by the neighboring node and the cost function.

12. The method according to claim 11, further comprising:
broadcasting the iterative parameter in the m-th iteration of the node to be positioned.

13. The method according to claim 1, wherein the set of reference nodes comprises at least four first-type nodes and/or at least one second-type node; the first-type nodes are used to send signals and do not receive signals; the second-type node is used to send signals, receive signals and process signal arrays.

14. The method according to claim 13, wherein the first-type nodes are satellites, and the second-type node is a base station.

15. The method according to claim 14, wherein the set of reference nodes also comprises a vehicle.

16. The method according to claim 1, wherein the node to be positioned is a vehicle to be positioned.

17. The method according to claim 1, wherein the initial orientation angle measurement information comprises a pitch angle and/or an azimuth angle of the node to be positioned relative to the reference node.

18. A computer device, comprising a memory and a processor, wherein the memory stores a computer program, and the processor, when executing the computer program, implements the steps of the method according to claim 1.

19. A non-transitory computer readable storage medium, comprising a computer program stored thereon, wherein when the computer program is executed by a processor, the steps of the method according to claim 1 are implemented.

20. A device for positioning a communication device, comprising:
a receiver configured to receive measurement information between a node to be positioned and a set of reference nodes of at least one type, the measurement information including an initial pseudorange and initial orientation angle measurement information between the node to be positioned and a reference node, and the set of reference nodes including at least one reference node; and
a processor configured to substitute the measurement information into a preset parametric formula to obtain positioning information of the node to be positioned, the parametric formula being used for indicating a possibility that the positioning information is a value of a preset variable, and the positioning information including position information, clock deviation information and orientation angle information of the node to be positioned.

* * * * *